United States Patent [19]

Smith

[11] Patent Number: 4,831,870
[45] Date of Patent: May 23, 1989

[54] METHOD AND APPARATUS FOR VACUUM TESTING GLASS BULBS FOR SPRINKLERS

[75] Inventor: Kevin W. Smith, Hastings, Mich.

[73] Assignee: The Viking Corporation, Hastings, Mich.

[21] Appl. No.: 110,839

[22] Filed: Oct. 21, 1987

[51] Int. Cl.$^4$ ............................................. G01M 3/04
[52] U.S. Cl. .................................... 73/49.3; 73/40.7
[58] Field of Search ................... 73/49.3, 40.7, 40, 52, 73/37

[56] References Cited

U.S. PATENT DOCUMENTS

| | | | |
|---|---|---|---|
| 2,010,698 | 8/1935 | Newkirk | 73/52 |
| 2,784,373 | 3/1957 | Lawrance et al. | 324/461 |
| 2,993,365 | 7/1961 | Allen et al. | 73/49.3 |
| 3,306,098 | 2/1967 | Kraus | 73/49.3 |
| 3,416,359 | 12/1968 | Durbin et al. | 73/40.7 |
| 3,572,096 | 3/1971 | Meyer | 73/40.7 |
| 3,678,756 | 7/1972 | Merrill | 73/49.3 |
| 3,888,111 | 6/1975 | Craig | 73/40.7 |
| 3,973,249 | 8/1976 | Yokote et al. | 73/49.3 |
| 4,167,974 | 9/1979 | Job | 169/38 |
| 4,426,876 | 1/1984 | Kakumoto | 73/49.3 |
| 4,593,554 | 6/1986 | Aarts | 73/49.3 |

OTHER PUBLICATIONS

Viking Technical Data, "Microfast Sprinkler Extended Coverage Horizontal Sidewall", Sep., 1986.

*Primary Examiner*—Hezron E. Williams
*Attorney, Agent, or Firm*—Price, Heneveld, Cooper, DeWitt & Litton

[57] ABSTRACT

A method of testing the integrity of fusible glass bulbs of the type used as actuators in automatic sprinkler fire protection systems includes the steps of placing the bulb in a vacuum chamber, evacuating the chamber to a predetermined vacuum level at which the fluid within the bulb would vaporize, maintaining the predetermined vacuum level for a set period and then releasing the vacuum within the chamber. The bulb is removed from the chamber and visually inspected to determine if there has been a loss of fluid. The apparatus includes the vacuum chamber, a vacuum pump and a control system for connecting the pump to the chamber, maintaining the vacuum level within the chamber at a predetermined level and then releasing the vacuum.

11 Claims, 1 Drawing Sheet

METHOD AND APPARATUS FOR VACUUM TESTING GLASS BULBS FOR SPRINKLERS

BACKGROUND OF THE INVENTION

The present invention relates to a vacuum testing method and apparatus and more particularly to a method and apparatus for testing the integrity of fusible glass bulb sprinkler heads.

Various forms of automatic fire protection systems are presently available. Such systems generally include a plurality of automatic sprinkler heads. Each sprinkler head includes a body which defines a nozzle, a frame supporting a deflector and a cap or closure plug which seals the nozzle. A thermally responsive assembly is positioned between the frame and the cap. The assembly releases the cap when a predetermined ambient temperature is reached. Various forms of thermally responsive assemblies have been used in automatic sprinkler heads. These assemblies include mechanical, fusible links as well as fusible glass bulbs. The fusible glass bulbs, depending upon their size and temperature rating are partially or completely filled with a glycerin, water and alcohol solution or other suitable fluid. The fusible bulb includes an elongated, narrow extension or pip formed when the bulb is closed or sealed after filling. The filled bulb will include a "bubble". The size of the bubble decreases with an increase in the temperature rating. When the bulb is heated, the pressure within the bulb increases until it breaks or shatters. When the fusible bulb shatters, the cap or plug is released, thereby opening the nozzle and actuating the sprinkler head.

The glass bulbs are relatively delicate. Handling of the bulbs during shipment, packaging and assembly may result in damage to the bulb which would not be noticeable by an unaided visual inspection. The bulb may in fact be cracked or the pip may be broken. Although damaged, the bulb may retain the solution within it and appear to be operative. However, when the bulb is heated beyond its rated temperature, the fluid or liquid within the bulb will be forced out through the crack. The internal pressure within the bulb is thereby released and the bulb will not break or shatter. The automatic sprinkler head will fail to actuate when needed.

A need exists for a method and apparatus for testing fusible glass bulbs and automatic sprinkler heads incorporating fusible glass bulbs to determine the integrity of the glass bulb.

SUMMARY OF THE INVENTION

In accordance with the present invention, a method and apparatus for effectively testing glass bulbs and glass bulb automatic sprinkler heads are provided. Essentially, the apparatus includes a vacuum chamber operatively connected to a vacuum pump. A plurality of valves and a control system are provided for reducing the pressure in the vacuum chamber to a predetermined level, maintaining the vacuum level for a predetermined time and then releasing the vacuum so that the pressure in the chamber returns to atmospheric. In use, glass bulbs or glass bulb actuated sprinkler heads are placed within the vacuum chamber and the pressure level within the chamber is reduced to a predetermined level in a controlled fashion. After cycling the vacuum level, the fusible glass bulb or automatic sprinkler head is removed from the vacuum chamber and visually inspected for loss of fluid. The predetermined vacuum level is such that the liquid solution within the bulb would vaporize if the solution is exposed to the vacuum through a crack or other imperfection. If the bulb is not intact, the liquid will be forced from the bulb. If the bulb is intact, the liquid would be sealed from the vacuum or reduced pressure level and the size of the bubble within the bulb will remain unchanged. Visual inspection of the glass bulb or sprinkler after testing will reveal those which have a major portion of the liquid missing. Defective heads may have the glass bulb replaced.

The method and apparatus in accordance with the present invention provide efficient and reliable testing o fusible glass bulbs and fusible glass bulb sprinkler heads. The method improves quality control and reduces the possibility of an automatic sprinkler head failing to actuate during fire conditions.

DETAILED DESCRIPTION OF THE PREFERRED EMBODIMENT

Figure 1:
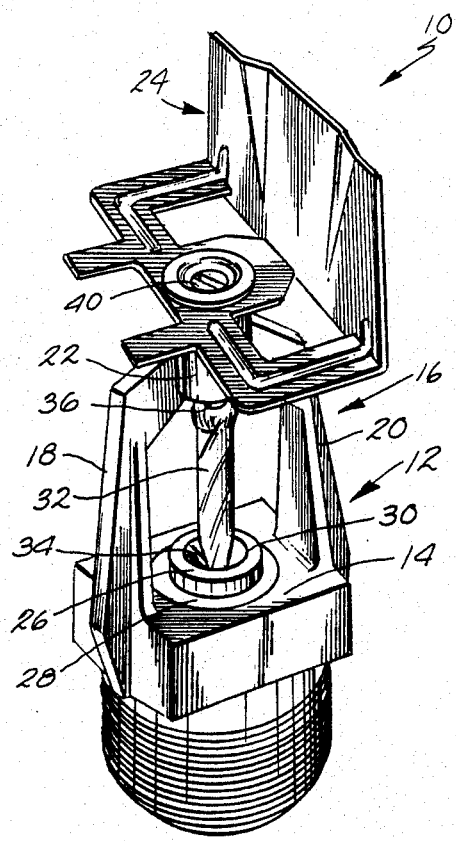
FIG. 1 is a perspective view of a glass bulb automatic sprinkler head.

An automatic sprinkler head incorporating a fusible glass bulb actuator is illustrated in FIG. 1 and generally designated by the numeral 10. Head 10 includes a body 12 defining a nozzle 14 and a frame 16. Frame 16 includes a pair of arms 18, 20 which are joined opposite the nozzle at a portion 22. A deflector 24 is attached to frame 16 at portion 22. A closure plug or cap 26 is disposed within an orifice defined by nozzle 14. Cap 26 is supported on nozzle 14 by a sealing spring 28. Cap 26 defines a recess 30. Extending between cap or plug 26 and portion 22 of frame 16 is a fusible glass bulb 32. Bulb 32 includes a narrow extension or pip 34 disposed within recess 30 and a closed end 36 engaged by a threaded adjustment member 40. In assembling the head, spring 28 and plug 26 are positioned within the orifice defined by nozzle 14. Member 40 is backed out and bulb 32 is placed in position. Member 40 is then adjusted so that the bulb holds the nozzle closed and the plug in position when the system is pressurized.

The fusible glass bulb 32 contains a liquid which is typically a glycerin, water and alcohol solution. The bulb is partially or completely filled depending upon the bulb size and temperature rating. Variations in the size of the bulb as well as the fill determine the actuating temperature. When filled, a bubble is formed within the bulb. When the bulb is exposed to heat, such as in a fire condition, and the actuating temperature is reached, the fluid expands increasing the internal pressure within the bulb causing the bulb to break or shatter. When the bulb shatters, water pressure within the fire protection system forces the plug or cap and sealing spring assembly from the nozzle orifice. Water flows from the sprinkler nozzle and strikes the deflector 24 forming the desired spray pattern to extinguish the fire.

The glass bulbs 32 are fairly delicate structures. Handling during packaging, shipment or assembly may result in hairline cracks or fractures which would not normally be detected. The bulb may still hold the liquid and appear to be operational. However, in a fire condition when the bulb is heated beyond its rated temperature, the fluid may be forced from the bulb relieving the internal pressure. If the internal pressure is released, the bulb may not shatter. This will result in the sprinkler head not being actuated in a fire condition.

Figure 2:
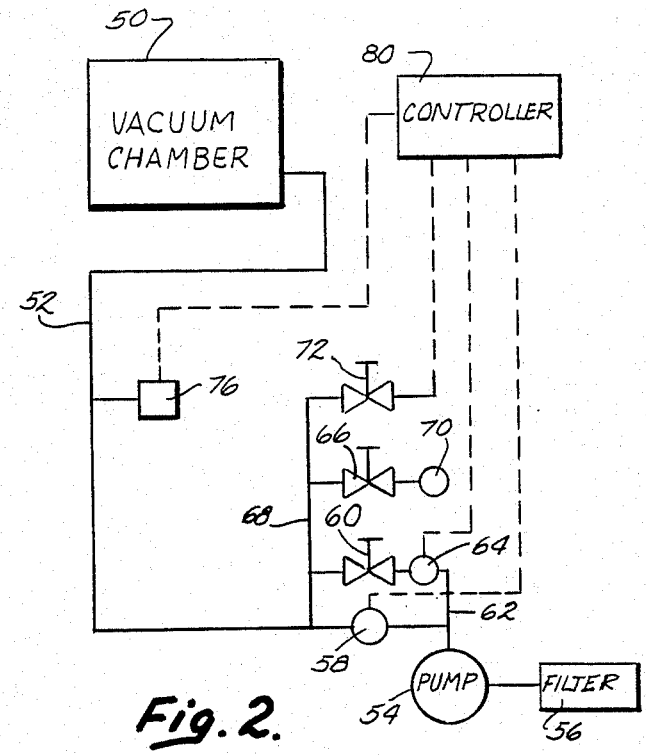
FIG. 2 is a schematic illustration of the apparatus in accordance with the present invention.

In accordance with the present invention, a unique method and apparatus are provided for testing the integrity of fusible glass bulbs. As illustrated in FIG. 2, the apparatus includes a vacuum chamber 50 connected through a line 52 to a vacuum pump 54. Vacuum pump 54 has an exhaust connected to a filter 56. Positioned in line 52 is a solenoid valve 58. A needle valve 60 is connected between the vacuum pump 54 and chamber 50 and around valve 58. Valve 60 is in a bypass line 62. Connected to valve 60 is a solenoid valve 64. Connected to chamber 50 downstream of valve 58 is another needle valve 66. Valve 66 is connected to line 52 by a line 68. A solenoid valve 70 connects valve 66 to atmosphere. A large outlet valve 72 which is manually actuated connects chamber 50 to atmosphere through line 68 and line 52. Positioned between solenoid valve 58 and the vacuum chamber is a vacuum transducer 76. Transducer 76 senses the vacuum level in chamber 50 and generates an output signal.

As schematically illustrated in FIG. 2, transducer 76 and solenoid valves 58, 64 and 70 are electrically connected to a controller 80. Controller 80 automatically controls the operation of the solenoid valves to reduce the pressure level within the vacuum chamber to a predetermined vacuum level, to maintain the predetermined level for a set period and then to release the vacuum during the testing cycle, as explained in more detail below.

Figure 3:
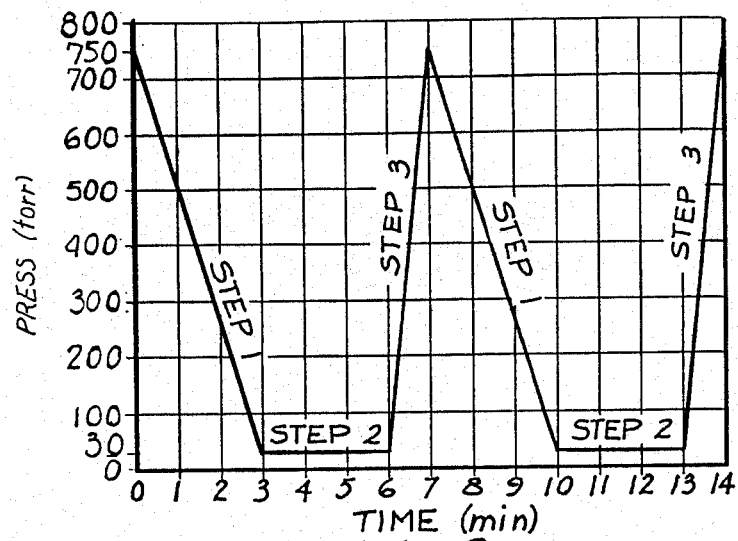
FIG. 3 is a graph illustrating the method of operation of the apparatus of FIG. 2.

In order to test a glass bulb or a glass bulb actuated sprinkler head in accordance with the present invention, the bulb or head is placed in the vacuum chamber 50. As shown in FIG. 3, a two cycle, three step procedure is employed. At this point, vacuum pump 54 is turned on. Needle valves 60 and 66 are adjusted. Solenoid valves 64, 70 and the large outlet pressure release valve 72 are closed. Controller 80 then opens solenoid valve 58 As illustrated in FIG. 3, the vacuum level or pressure level within chamber 50 is then reduced during Step 1 from atmospheric pressure to a predetermined level of approximately 30 torr. When the predetermined vacuum level is reached, controller 80 closes solenoid valve 58. The vacuum level within chamber 50 is sensed by transducer 76. The signal from transducer 76 is processed by controller 80 which opens solenoid valve 64 as needed to regulate the vacuum level within chamber 50 to maintain the level at the predetermined value during Step 2. The predetermined vacuum level is selected to be that a which the liquid within glass bulb 32 will vaporize or boil. If the glass bulb is cracked or if the pip 34 has been broken, the liquid within the bulb is subjected to the reduced pressure or vacuum level. The bubble in the bulb will then expand, forcing the liquid from the fractured bulb. Once the boiling point of the liquid is reached, the liquid evaporates. If the bulb is intact, the liquid within the bulb is sealed from the reduced pressure and remains unchanged.

Figure 4:
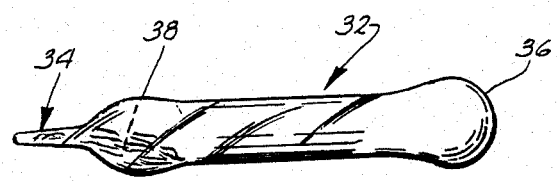
FIG. 4 is a plan view of the fusible glass bulb after testing.

As illustrated in FIG. 3, the second step at which the predetermined vacuum level is maintained continues for a period of approximately three minutes. At the conclusion of the second step in the process, the third step occurs at which the vacuum is released. The chamber is exposed to atmospheric pressure in a controlled fashion. Controller 80 during step 3 opens solenoid valve 70 and repressurization is controlled through the needle valve 66. Valve 66 is set so that the pressurization step occurs over an approximate one minute time period. It is presently preferred that the controller 80 causes the three step cycle to be repeated, as illustrated in FIG. 3. At the conclusion of the double cycle evacuation and repressurization steps, the bulb or sprinkler head is removed from the vacuum chamber. If the bulb were defective, a substantial portion of the liquid will have evaporated. A defective bulb is illustrated in FIG. 4. As shown therein, only a small portion of the fluid 38 remains within the bulb. A simple visual inspection permits defective bulbs to be identified.

Prior to placing the bulb or head within the vacuum chamber, the size of the bubble may be measured. After the bulb has been exposed to the predetermined vacuum level and removed from the chamber, the size of the bubble may again be measured. The bubble size after testing may then be compared to the original bubble size to determine if any liquid has been lost during the testing cycles.

The apparatus in accordance with the present invention employs commercially available components. The vacuum chamber, for example, may be one produced by Russell's Technical Products. It is preferred that the chamber and vacuum pump be capable of running down to approximately 20 torrs. Vacuum levels of at least 30 torrs will be necessary to properly test presently existing fusible glass bulbs. The liquid within such glass bulbs generally will vaporize at vacuum levels of around 30 torrs. Needle valves 60, 66 are provided to control application of the vacuum to the chamber during step 2 of the cycle and to control the repressurization of the chamber. It is desired that the chamber be repressurized to atmospheric in a controlled fashion. A vacuum transducer usable in the apparatus is a readily available commercial item. Controller 80 may be easily constructed by one of ordinary skill in the art to perform the double cycle, three step process. The controller may be a programmable microprocessor or relay arrangement and timer for controlling the operation of the solenoid valves 58, 64 and 70 as well as the operation of the vacuum pump 54.

The apparatus and method in accordance with the present invention provides an efficient and reliable method of testing the integrity of fusible glass bulbs. The apparatus and method reduces the pressure levels within the chamber to a point below the boiling point or vaporization point of the liquid within the glass bulbs. This accelerates detection of leaks from a faulty bulb. The method and apparatus improves quality control checks and prevents or eliminates sprinkler head failure.

In view of the above description, those of ordinary skill in the art may envision various modifications which will not depart from the inventive concepts disclosed herein. It is, therefore, expressly intended that the above description should be considered as only that of the preferred embodiment. The true spirit and scope of the present invention may be determined by reference to the appended claims.

The embodiments of the invention in which an exclusive property or privilege is claimed are defined as follows:

1. A method of testing the integrity of fusible glass bulbs of the type having a liquid therein and which are used as actuators in automatic sprinkler fire protection systems, said methods comprising the steps of:

placing the glass bulb in a vacuum chamber;
evacuating the chamber to a predetermined vacuum level at which the liquid within the bulb would vaporize;
maintaining the predetermined vacuum level for a set period;
releasing the vacuum within the chamber;
visually inspecting the glass bulb for loss of fluid; and
measuring the size of a bubble within the glass bulb prior to placing the bulb within the vacuum chamber.

2. A method as defined by claim 1 wherein said steps of evacuating the chamber, maintaining the predetermined vacuum level and releasing the vacuum are repeated before said step of visually inspecting the glass bulb is performed, 3. A method as defined by claim 2 wherein said evacuating step lowers the pressure within said chamber to a level of approximately 30 torrs.

4. A method as defined by claim 3 wherein said evacuating step lowers the pressure within said chamber from atmosphere to said predetermined vacuum level over a period of approximately three minutes.

5. A method as defined by claim 4 wherein said set period at which the predetermined vacuum level is maintained is approximately three minutes.

6. A method of testing the integrity of fusible glass bulbs of the type having a liquid therein and which are used as actuators in automatic sprinkler fire protection systems, said method comprising the steps of:
placing the glass bulb in a vacuum chamber;
evacuating the chamber to a predetermined vacuum level at which the liquid within the bulb would vaporize;
maintaining the predetermined vacuum level for a set period;
releasing the vacuum within the chamber; and
visually inspecting the glass bulb for loss of fluid, said steps of evacuating the chamber, maintaining the predetermined vacuum level and releasing the vacuum are repeated before said step of visually inspecting the glass bulb is performed, said evacuating step lowers the pressure within said chamber to a level of approximately 30 torrs, said evacuating step lowers the pressure within said chamber from atmosphere to said predetermined vacuum level over a period of approximately three minutes, said set period at which the predetermined vacuum level is maintained is approximately three minutes, and wherein said step of releasing the vacuum repressurizes the vacuum chamber from said predetermined vacuum level to atmospheric pressure over a time period of approximately one minute.

7. A method as defined by claim 6 further including the step of measuring the size of a bubble within the glass bulb prior to placing the bulb within the vacuum chamber.

8. A method as defined by claim 1 wherein the step of visually inspecting the bulb includes the step of measuring the size of the bubble within the glass bulb and comparing such measured size to the measured size of the bubble prior to placing the bulb within the chamber.

9. A method as defined by claim 7 wherein the step of visually inspecting the bulb includes the step of measuring the size of the bubble within the glass bulb and comparing such measured size to the measured size of the bubble prior to placing the bulb within the chamber.

10. Apparatus for testing the integrity of a fusible glass bulb of the type used as an actuator in automatic sprinkler fire protection systems, said apparatus comprising:
a vacuum chamber for receiving a plurality of glass bulbs;
a vacuum pump connected to the vacuum chamber, said vacuum pump being capable of maintaining a vacuum level within the chamber of approximately 30 torrs;
valve means for connecting said vacuum chamber to said vacuum pump and to atmosphere, said valve means including a first solenoid valve connected to said chamber and said pump, a needle valve connected to said chamber and said pump around said first solenoid, a second solenoid valve connecting said needle valve to said vacuum pump, and a vacuum release valve connected to said vacuum chamber; and
control means operatively connected to said valve means for reducing pressure within the chamber until a predetermined vacuum level of approximately 30 torrs is obtained then maintaining the pressure at said predetermined vacuum level and then releasing the vacuum within the chamber after a predetermined time period, said control means automatically cycling to again reduce the pressure to the predetermined vacuum level, maintain the pressure at said predetermined vacuum level and then release the vacuum after the predetermined time period.

11. An apparatus as defined by claim 10 wherein said control means includes a vacuum transducer for sensing the vacuum level within said chamber.

* * * * *